(12) United States Patent
Sun et al.

(10) Patent No.: US 7,683,881 B2
(45) Date of Patent: Mar. 23, 2010

(54) VISUAL INPUT POINTING DEVICE FOR INTERACTIVE DISPLAY SYSTEM

(75) Inventors: Brian Y. Sun, Garland, TX (US); Jung Yu Chen, Taipei (TW)

(73) Assignee: Keytec, Inc., Garland, TX (US)

( * ) Notice: Subject to any disclaimer, the term of this patent is extended or adjusted under 35 U.S.C. 154(b) by 642 days.

(21) Appl. No.: 10/852,303

(22) Filed: May 24, 2004

(65) Prior Publication Data

US 2005/0260986 A1      Nov. 24, 2005

(51) Int. Cl.
*G09G 5/00*      (2006.01)
(52) U.S. Cl. .................. 345/156; 345/157; 345/158; 345/169
(58) Field of Classification Search ......... 345/158–159, 345/157, 456, 169; 348/744, 807, 745
See application file for complete search history.

(56) References Cited

U.S. PATENT DOCUMENTS

| | | | | |
|---|---|---|---|---|
| 1,460,644 | A * | 7/1923 | Dollison et al. ............. | 362/280 |
| 5,394,183 | A * | 2/1995 | Hyslop ....................... | 348/88 |
| 5,450,148 | A * | 9/1995 | Shu et al. .................... | 353/42 |
| 5,473,464 | A * | 12/1995 | Knowles et al. ............. | 359/237 |
| 5,502,459 | A * | 3/1996 | Marshall et al. ............. | 345/158 |
| 5,504,501 | A * | 4/1996 | Hauck et al. ................ | 345/158 |
| 5,572,251 | A * | 11/1996 | Ogawa .................. | 348/207.99 |
| 5,585,652 | A * | 12/1996 | Kamasz et al. .............. | 257/231 |
| 5,650,832 | A * | 7/1997 | Poradish et al. ............. | 348/743 |
| 5,663,828 | A * | 9/1997 | Knowles et al. ............. | 359/237 |
| 5,682,181 | A * | 10/1997 | Nguyen et al. .............. | 345/158 |
| 5,739,809 | A * | 4/1998 | McLaughlin et al. ........ | 345/594 |
| 5,742,698 | A * | 4/1998 | Minami et al. .............. | 382/100 |
| 5,914,783 | A * | 6/1999 | Barrus ........................ | 356/614 |
| 5,995,663 | A * | 11/1999 | Itsuzaki et al. .............. | 382/203 |
| 6,050,690 | A * | 4/2000 | Shaffer et al. ............... | 353/122 |
| 6,275,214 | B1 * | 8/2001 | Hansen ....................... | 345/158 |
| 6,292,171 | B1 * | 9/2001 | Fu et al. ..................... | 345/156 |
| 6,317,118 | B1 * | 11/2001 | Yoneno ....................... | 345/158 |

(Continued)

*Primary Examiner*—Richard Hjerpe
*Assistant Examiner*—Jennifer T Nguyen
(74) *Attorney, Agent, or Firm*—Scott T. Griggs; Griggs Bergen LLP

(57) ABSTRACT

An interactive presentation system uses a presentation computer, a computer-controlled image projector and a projection screen, in which control of the presentation computer is accomplished by using a wireless optical pointer that projects an encoded control cursor onto the projection screen. The projected screen images are monitored by a video camera, and the control cursor is scanned, detected and decoded for emulating various keyboard commands and/or pointing device (mouse, touch pad, track ball) position-dependent cursor operations. The control cursor is reliably detected and its coordinate location is accurately determined on the basis of one or more primary image attributes, for example image intensity and image repetition rate, both of which are independent of monitoring angles and pointing device projection angles, and one or more secondary image attributes, for example image size, color and pattern. Neither of the primary attributes can be masked or obscured by the presence of background screen images or objects. Although the secondary attributes of the control cursor may be identical with the attributes of background images, reliable decoding of a computer command is assured since analysis and decoding of the secondary attributes are conditionally performed only after the control cursor image has been detected and captured (stored in memory for determination of coordinate location) on the basis of one or more of the independent attributes.

17 Claims, 3 Drawing Sheets

U.S. PATENT DOCUMENTS

| | | | |
|---|---|---|---|
| 6,323,839 B1* | 11/2001 | Fukuda et al. | 345/157 |
| 6,331,848 B1* | 12/2001 | Stove et al. | 345/156 |
| 6,346,933 B1* | 2/2002 | Lin | 345/157 |
| 6,454,419 B2* | 9/2002 | Kitazawa | 353/122 |
| 6,483,555 B1* | 11/2002 | Thielemans et al. | 348/745 |
| 6,618,076 B1* | 9/2003 | Sukthankar et al. | 348/180 |
| 6,690,357 B1* | 2/2004 | Dunton et al. | 345/158 |
| 6,704,000 B2* | 3/2004 | Carpenter | 345/158 |
| 6,729,731 B2* | 5/2004 | Gnanamgari et al. | 353/42 |
| 6,738,044 B2* | 5/2004 | Holzrichter et al. | 345/158 |
| 7,091,949 B2* | 8/2006 | Hansen | 345/158 |
| 7,134,078 B2* | 11/2006 | Vaarala | 715/730 |
| 7,180,510 B2* | 2/2007 | Inoue et al. | 345/180 |
| 7,193,608 B2* | 3/2007 | Stuerzlinger | 345/156 |
| 2002/0073124 A1* | 6/2002 | Masuda et al. | 707/526 |
| 2002/0186351 A1* | 12/2002 | Gnanamgari et al. | 353/42 |
| 2003/0133081 A1 | 7/2003 | Miyashita | |
| 2003/0169233 A1 | 9/2003 | Hansen | |
| 2004/0264778 A1* | 12/2004 | Liang et al. | 382/203 |

* cited by examiner

VISUAL INPUT POINTING DEVICE FOR INTERACTIVE DISPLAY SYSTEM

BACKGROUND OF THE INVENTION

1. Field of the Invention

The present invention is related generally to interactive presentation systems using a display computer, a computer-controlled image projector and a projection screen, and in particular to an interactive display system in which computer control is accomplished by using a wireless optical pointer to project an encoded control cursor onto the projection screen. The projected images are monitored by a video camera, and the control cursor is scanned, detected and decoded for initiating various keyboard commands and/or pointing device (mouse, touch pad, track ball) position-dependent cursor operations.

2. Description of the Related Art

Interactive image projection and display systems use technologies including ultrasonic, infrared and radio frequency (RF) techniques to provide increased user mobility relative to the computer processor and/or display screen. These technologies typically employ a transmitter and receiver to communicate control and status information between the operator and the computer. Display systems have been developed for remotely initiating various computer keyboard commands and/or pointing device (mouse, touch pad, track ball) position-dependent cursor operations, e.g., select, move, left click, right click and double click.

Conventional display systems use sensors positioned on the operator or on the computer, and/or on a display screen to detect movement of the user and/or a wireless pointing device relative to the sensors. While generally acceptable for some applications, these techniques may be subject to proximity or distance limitations. Likewise, these systems require complex and often expensive equipment that may not be readily adaptable to different facilities and may not meet the specific needs of large as well as small viewing audiences.

Portable laptop and notebook computers are now being used for graphical presentations and/or demonstrations, and large display screens are used for slide show presentations and computer generated images to large audiences. Many presentations, such as slide shows and the like, require relatively simple control of the computer during presentation. Commands that advance or reverse slides or initiate a display sequence require only a basic user interface or remote control to communicate with the computer.

More sophisticated presentations, for example computer generated web images containing browser-searchable on-line content, require a complex remote controller interface to effectively operate the computer and position the cursor on the presentation screen for browser control. At the display computer, either the presenter or an assistant controls the projected image by means of key strokes or pointing device (mouse, touch pad, track ball) manipulations to produce position-dependent cursor operations that position a cursor in the appropriate area of the computer monitor display screen, thus exercising control over content selection.

Improvements have been proposed in which an external control cursor is projected by an optical pointer and displayed on the presentation screen. The control cursor is monitored by a remote video camera, and an attribute of the control cursor, e.g., pattern, color, or pixel area size, is decoded and used to emulate a particular keyboard or pointing device operation for input as a command signal to the computer. One limitation of this arrangement is the difficulty in reliably differentiating and detecting the control cursor relative to background images, graphical content and objects projected onto the presentation screen.

Another limitation is that the shape or profile of the projected image of the control cursor may not be reproduced faithfully on the presentation screen unless the optical viewing axis of the monitoring camera and the projection axis of the optical pointer are in alignment. The positioning of the video camera and the optical pointer to provide ideal projection and monitoring angles is unlikely to occur in practice, since the projection orientation of the hand-held pointer will be constantly changing as the presenter moves about, resulting in distortion of the image shape and pixel area size.

There is a continuing interest in providing a system for remotely controlling the computer of an interactive image projection display system that will simplify command and control, while providing reliable execution of remote commands while using an optical pointer at various projection angles, especially in connection with the selection and display of rich content browser images, while giving the presenter improved mobility, thus allowing the presenter to focus his attention on the presentation while minimizing the actions needed to exercise control over content selection and computer operation.

BRIEF SUMMARY OF THE INVENTION

The present invention provides a system and method for remotely controlling a computer having an associated computer-controlled image projector and presentation screen for displaying projected images and having a wireless optical pointer for projecting an encoded control cursor onto the presentation screen. The control cursor is characterized by one or more primary attributes, for example image intensity or image repetition (blink) rate, that are independent of projection angle limitations as well the attributes of projected background images and objects. The control cursor is also characterized by one or more secondary attributes, for example pixel area (image size), color, or pattern (image shape), that correspond with specific computer commands. Preferably, the image properties of the primary attributes and secondary attributes are mutually exclusive with respect to each other, respectively, thus allowing cursor-related processing operations to be performed conditionally and independently.

The control cursor is reliably detected and its coordinate location is accurately determined on the basis of either image intensity or image repetition rate, both of which are independent of monitoring angles and pointing device projection angles. Moreover, neither one of the primary attributes can be masked or obscured by the presence of background images or objects. Although the secondary attributes of the control cursor may be identical with the attributes of background images, reliable decoding of the command is assured since analysis and decoding of the secondary attributes is conditionally performed only after the control cursor image has been detected and captured (stored in memory for determination of coordinate location) on the basis of the independent attribute.

The presentation screen is monitored by a remote video camera that produces streaming video images of the screen presentation. An image processor scans the streaming video frame by frame and captures a frame containing the control cursor image. The control cursor image is detected by differentiating it relative to the background images on the basis of one or more of primary attributes, for example image intensity or repetition (blink) rate. The control cursor coordinates are then determined and stored in memory.

The video processor then decodes one or more of the secondary attributes, for example image size (pixel count), or image color, or image pattern, and stores this information in memory for cross reference comparison to a set of commands in a look-up table. The decoded information is used for selecting a specific computer command based on the at least one secondary attribute of the encoded cursor.

In one embodiment, the invention includes a computer connected to an image projector that projects a computer generated image onto an external presentation screen, and the optical pointer is a laser pointer that projects a control cursor in the form of a monochromatic laser beam spot image having a predetermined image intensity or repetition rate as its primary attributes, and one or more user selectable image colors, sizes, patterns or repetition rates as its secondary attributes, corresponding with a set of specific computer commands.

In another embodiment, the optical pointer is a pointer having a polychromatic light source that projects a control cursor in the form of a visible light beam image having a predetermined image intensity as its primary attribute, and one or more user selectable image colors, sizes, patterns or repetition rates as its secondary attributes, corresponding with a set of specific computer commands.

Images projected onto the presentation screen are scanned and sensed by a remote video camera. The video images are scanned frame by frame and the image of the encoded control cursor is detected by the image processor and decoded by routines executed under the control of recognition software in the image processor. An optical pointer, equipped with a polychromatic light source or a monochromatic light source (e.g., a laser), generates and transmits the encoded control cursor image.

Recognition techniques are used for detection and differentiation of the control cursor relative to other projected images on the display screen. After detection of the control cursor with reference to a primary attribute, one or more of the secondary attributes are decoded and used alone or in combination to generate a corresponding command or commands to control the computer. These commands may be used to emulate control of the computer typically provided by a conventional peripheral I/O control device such as a mouse, track ball, or keyboard.

By using an optical pointing device such as a pointer equipped with a polychromatic light source and an optical cursor image template, and pattern recognition capability in the video image processor, the present invention allows the presenter to reliably input position dependent commands to a remotely located computer based on predetermined geometrical patterns.

Moreover, the present invention provides a relatively simple remote user interface that enables conventional keyboard and pointing device commands to be input to the computer, comparable to operation of a mouse, track ball or keyboard. The present invention permits a user to control a computer for a screen display presentation from any location where the display presentation screen is accessible via an optical pointer and can be monitored by a remote video camera.

BRIEF DESCRIPTION OF THE SEVERAL VIEWS OF THE DRAWING

The accompanying drawing is incorporated into and forms a part of the specification to illustrate the preferred embodiments of the present invention. Various advantages and features of the invention will be understood from the following detailed description taken with reference to the attached drawing figures in which.

DETAILED DESCRIPTION OF THE INVENTION

Figure 1:
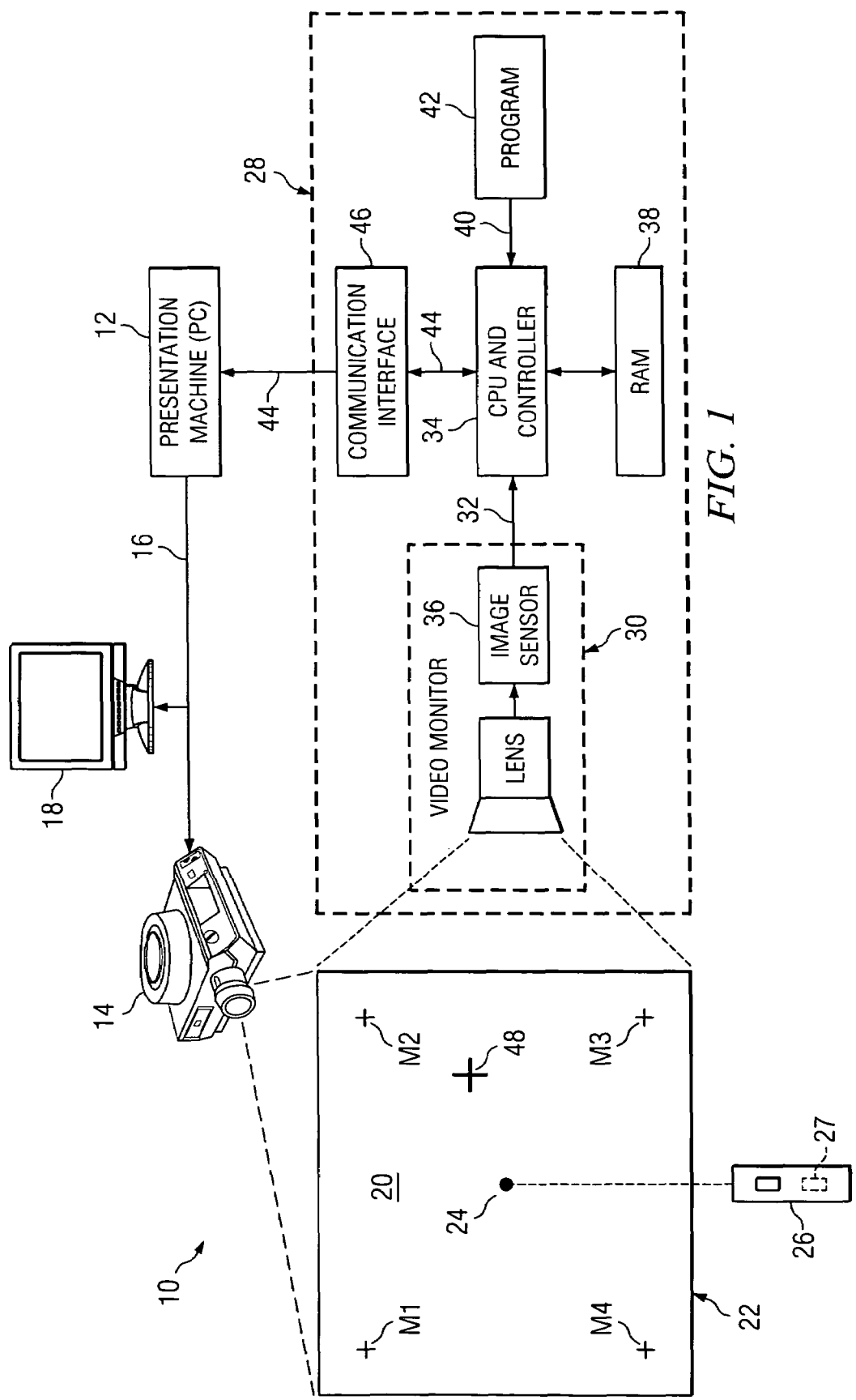
FIG. 1 is a system block diagram showing an interactive computer presentation system with an optical beam pointer and video scanning for remotely controlling a presentation computer according to the present invention.

Preferred embodiments of the invention will now be described with reference to various examples of how the invention can best be made and used. Like reference numerals are used throughout the description and several views of the drawing to indicate like or corresponding parts.

Referring now to FIG. 1, an interactive computer presentation system 10 with optical tracking for remotely controlling computer and projector operations is shown. The remote control capability includes control over various application programs, for example a browser and/or the operating system of a presentation computer 12, as well as the operation of an optical video projector 14. The presentation computer 12 generates a video output signal 16 derived from a local or remote program source (e.g., a browser, modem link or compact disk) that is output to a local display monitor 18, for example a flat screen LCD display of a lap top or notebook computer, and also output to the video projector 14. The video projector 14 projects visible video images 20 corresponding to the computer generated video signal output 16 onto a projection surface or display screen, indicated generally by reference numeral 22.

Preferably, the display screen 22 is a conventional passive presentation screen, remotely located from the presentation computer 12 and of a light color to provide sufficient contrast relative to the projected image of computer output generated by the video projector 14. Various surfaces may be used to provide a passive projection surface, including fine textured slide show display screens, painted walls, and the like.

Other presentation display systems can be used to good advantage in the practice of the present invention including active display devices, for example, a television CRT monitor, a liquid crystal display (LCD) screen of a laptop or notebook computer, plasma display screens, electrolumenescent display screens and optical projection display screens (front and rear), Referring again to FIG. 1, an encoded control cursor 24 is superimposed on the projected video program image 20 which is output from the presentation computer 12. The control cursor 24 is generated externally relative to the presentation computer 12, i.e., generated by some other device which could include another computer, an optical image projector, or the like. In the preferred embodiment, the control cursor 24 is generated by a hand-held optical pointer 26 that is capable of projecting a control cursor having one or more primary attributes and one or more secondary attributes, and capable of varying at least one of the secondary attributes.

The primary attributes of the control cursor 24 are independent of projection and monitoring angle limitations as well as presentation background image limitations. In the preferred embodiment, the primary image attributes that satisfy these criteria are cursor image intensity and image repetition rate (blink rate), either of which may be used for control cursor detection. The secondary attributes of the control cursor 24 may be identical or similar to the attributes of the projected background images. Preferably, the secondary attributes of the control cursor that can be encoded and varied to correspond with predetermined commands include color, size and a predetermined pattern, shape or geometrical profile.

In the preferred embodiment, the optical pointer 26 produces a control cursor 24 that has a significantly higher image intensity than the projected screen image 20 and is therefore easily differentiated from computer generated images, objects and other program material appearing on the presentation screen 22. This feature is provided by a beam projector circuit 27 that producing a continuous laser beam having a predetermined image intensity that is relatively greater than the expected peak value of the image intensity of the presentation background images. Moreover, the optical pointer 26 is operable to vary one of the secondary attributes, for example the color, shape, size or illumination pattern of the control cursor 24, to generate one or more commands to remotely control the browser and/or the operating system of the presentation computer 12.

Figure 2:
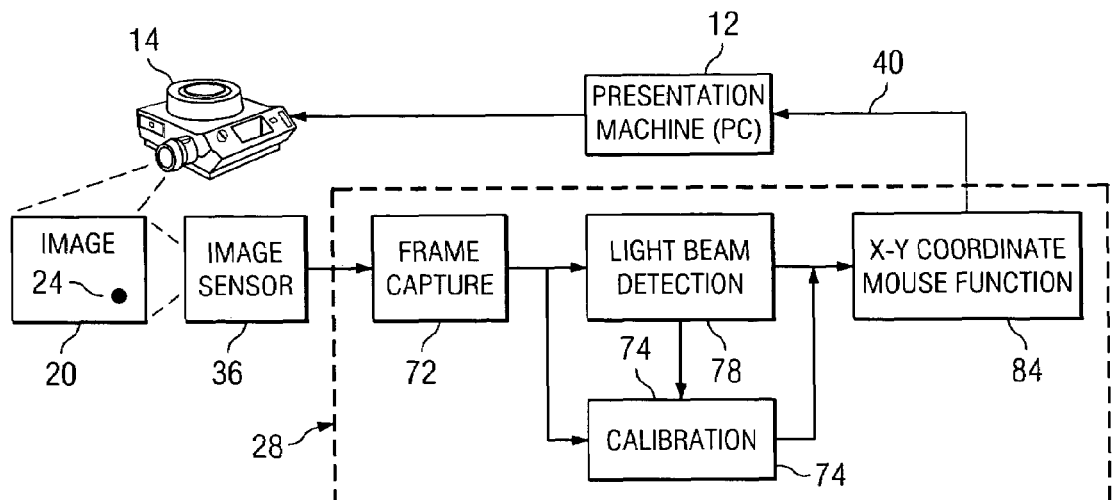
FIG. 2 is a simplified image processing functional block diagram showing video frame capture and control cursor image processing according to the present invention.

Referring now to FIG. 1 and FIG. 2, an image processor 28 receives video input from a video monitor camera 30 focused on the presentation screen 22. The video monitor camera outputs a streaming video signal 32 to a microprocessor 34. The video monitor camera 30 includes an image sensor 36 that scans an image including at least a substantial portion of the projected image 20 appearing on the presentation screen 22, and generates a digital image that is output as the streaming video signal 32. Optionally, where an active presentation screen is utilized, the video monitor camera 30 scans at least a substantial portion of the active presentation screen, e.g., a computer monitor, lap top LCD display, or television CRT monitor.

The image processor 28 analyzes the scanned image frame by frame to identify the frame containing the control cursor image 24 as uniquely identified by one or more of its embedded primary attributes, captures the frame image and stores it in RAM memory 38 for analysis, and determines the coordinate location of the control cursor. The image processor then determines (decodes) at least one secondary attribute of the control cursor 24 as directed by instructions 40 fetched from conventional analytical and recognition software operating programs stored in a memory module 42.

In the preferred embodiment, the position coordinates of the control cursor 24 and the decoded command data are output as a serial data stream 44 from the microprocessor 34 via a communications interface 46 to the presentation computer 12. The communications interface may be implemented by any conventional means, e.g., wireless (infra-red, R.F. or acoustic wave) or by signal conductor (universal serial bus, RS232 or PS/2 port) communication links. The presentation computer 12 receives the serial data 44 and generates an appropriate command or commands to move an internal computer generated cursor 48 to approximately the same position as the control cursor 24.

After the control image with its embedded primary attribute has been detected and the position of the control cursor has been determined, the image processor 28 processes the captured image of the control cursor 24 to decode one or more of the secondary attributes to generate position-dependent command signals that are used to remotely control the presentation computer 12. Such position or context-dependent commands may emulate commands such as "left-click" or "right-click" generated by a traditional computer peripheral I/O device, such as a mouse, track ball, touch pad, or the like. Likewise, various other commands including command signals for operating the video projector 14 may be associated with one or more secondary attributes of the control cursor 24.

The presentation computer 12 periodically generates calibration marks M1, M2, M3 and M4 to calibrate or register the image captured by the video monitor camera 16 relative to the presentation image 22 that is projected on the presentation screen 22. Preferably, the presentation image also contains computer generated boundary marks that are used to delineate the active tracking region where scanning for the control cursor 24 is performed.

The calibration or registration process may be repeated automatically at predetermined intervals, based on a user request, and/or when the control cursor 24 is not detected. Preferably, the tracking boundary marks are moved inwardly from the calibration corners toward the center of the screen to simplify detection of the control cursor and subsequent analysis and decoding of its secondary attributes. In this embodiment, only the area delineated by calibration marks is searched or scanned to detect the frame containing the control cursor 24. If a frame containing the control cursor is not detected within the area defined by boundary marks, the boundary marks are progressively moved toward the original calibration corners of the processed image until the control cursor 24 is detected.

The video frames are repeatedly captured and processed to detect a frame containing an image characterized by at least one primary attribute of the control cursor 24. Typical frame capture rates are thirty or sixty frames per second. The frame capture rate of the video camera 30 and/or the output of an active screen or projector are selected to minimize aliasing and other interference within the frequency bands of interest. Any such interference effects may also be reduced by appropriate filtering of the captured image.

Determination of the locations of the display field boundary corners and the attributes of the control cursor is simplified because their identifying characteristics are known. Identification and analysis of the control cursor 24 within the captured frame image may be accomplished using any number of known image processing techniques. For example the pixel intensity differential method may be used to find calibration marks that indicate the corner boundaries of the display field. Also, the intensity differential method may be used to detect and confirm the presence of the control cursor primary attributes of image intensity and image repetition (blink) rate for initial detection and control cursor location purposes.

Conventional analytical and recognition software may be used to detect and recognize the various secondary attributes of the control cursor 24, e.g., color, image size, shape and pattern. The present invention is independent of the particular image processing techniques utilized to identify or detect the primary and secondary attributes of the control cursor. An exemplary method for determining position and attribute information of the control cursor is provided below.

The locations of image corners and the control cursor 24 are determined according to conventional video quadrant analysis. Once the calibration or registration process has determined the corner coordinates, at least one primary attribute of the control cursor 24 is monitored or tracked by repeatedly capturing and analyzing frames as illustrated and described with reference to FIG. 11. According to the preferred embodiment of the invention, the position of the control cursor 24 is determined by reference to one or more of the known primary attributes of the control cursor. The secondary attributes of the control cursor 24, such as shape, color, size and pattern, are conditionally analyzed and decoded only after one or more of the primary control cursor attributes has been detected and confirmed within a captured frame.

The primary and secondary attributes embedded in the control cursor are detected and decoded by routines executed by the analytical and recognition software 42 in the image processor 28. The primary image attribute, image intensity, is preset in the optical projector to a relatively high level relative to the expected value of the peak image intensity of the presentation background images. The primary image attribute, cursor repetition (blink) rate, is also preset at a predetermined repetition rate. In these embodiments, the optical pointer is a monochromatic optical pointer, for example a laser pointer, equipped with a control circuit for emitting a continuous laser beam at a predetermined image intensity, and optionally, at a predetermined image intensity and predetermined repetition rate.

Figure 10:
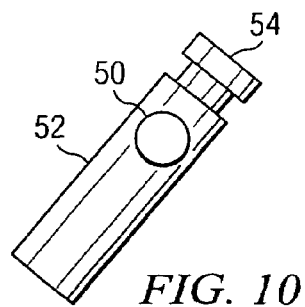
FIG. 10 is a top plan view of an optical pointer equipped with a rotary template for projecting control cursor images having predetermined patterns, profiles and shapes.

The secondary attribute of shape, geometrical profile or pattern of an encoded control cursor 24 is produced by projecting a polychromatic optical beam through a special aperture formed in a user selectable, rotary carousel or template 50 contained in the pointer, as represented by the optical pointer 52 shown in FIG. 10. Likewise the secondary attribute of cursor image color is varied by projecting an optical beam of polychromatic light through a selected color filter of an array of color filters carried on the rotary carousel 50. The filtered light beam is focused on the presentation screen by an adjustable lens 54.

Figure 3:
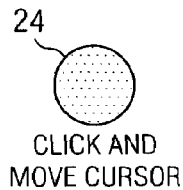
FIG. 3 illustrates an example of an encoded control cursor image configuration produced by an optical pointer, that corresponds to the command "click and move cursor."
Figure 4:
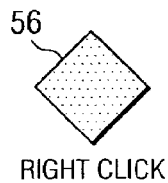
FIG. 4 illustrates an example of an encoded control cursor image configuration produced by an optical pointer, that corresponds to the command "right click."
Figure 5:
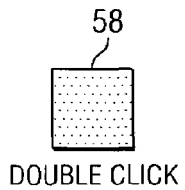
FIG. 5 illustrates an example of an encoded control cursor image configuration produced by an optical pointer, that corresponds to the command "double click."
Figure 6:
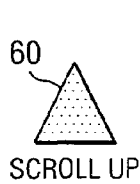
FIG. 6 illustrates an example of an encoded control cursor image configuration produced by an optical pointer, that corresponds to the command "scroll up."
Figure 7:
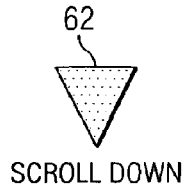
FIG. 7 illustrates an example of an encoded control cursor image configuration produced by an optical pointer, that corresponds to the command "scroll down."
Figure 8:
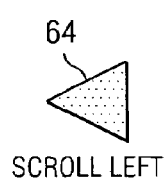
FIG. 8 illustrates an example of an encoded control cursor image configuration produced by an optical pointer, that corresponds to the command "scroll left."
Figure 9:
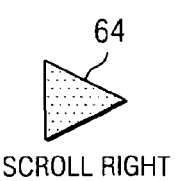
FIG. 9 illustrates an example of an encoded control cursor image configuration produced by an optical pointer, that corresponds to the command "scroll right."

Preferred cursor image patterns are represented by regular geometrical shapes, as indicated by the circular or spot profile 24 (FIG. 3), corresponding with the command "click and move cursor"; the diamond profile 56 (FIG. 4), corresponding with the command "right click"; the rectangular profile 58 (FIG. 5), corresponding with the command "double click"; the pyramid profile 60 (FIG. 6), corresponding with the command "scroll up"; the inverted pyramid profile 62 (FIG. 7), corresponding with the command "scroll down"; the triangular profile 64 (FIG. 8), corresponding with the command "scroll left"; and the triangular profile 66 (FIG. 9) corresponding with the command "scroll right."

Figure 11:
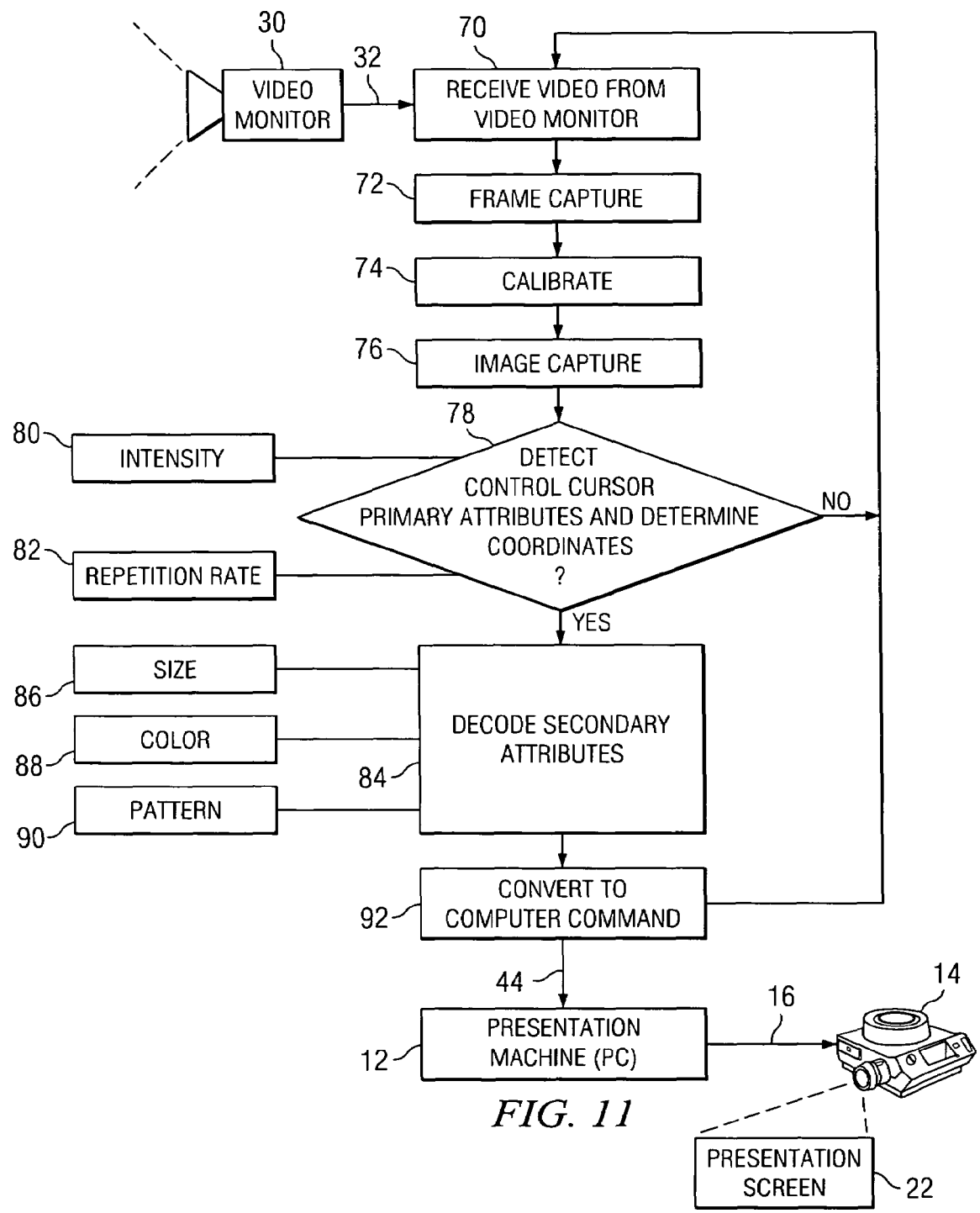
FIG. 11 is a flow chart that illustrates capture, detection, and decoding of an external control cursor according to the present invention.

A flowchart illustrating operation of one embodiment of a system and method for remotely controlling a computer according to the present invention is shown in FIG. 11. Preferably, the control logic indicated in FIG. 11 is implemented under software which is executed by a microprocessor-based presentation computer, such as a laptop or notebook presentation computer, represented generally by presentation computer 12 of FIG. 1. Various portions or functions of the control logic may be implemented in software, hardware, or a combination of software and hardware. The flowchart of FIG. 11 illustrates one loop and its operations are preferably repeated at periodic time intervals or as required by some internal interrupt or control event.

Preferably, the control logic represented in FIG. 11 is embodied in data stored on a presentation computer readable storage medium, such as a floppy disk, hard disk, CD-ROM, tape, or other magnetic, optical or combination device. The presentation computer readable storage medium includes data representing instructions executable by a presentation computer to generate commands for remotely controlling a presentation computer according to the present invention.

Step 52 may be periodically repeated depending upon the particular application. For example, step 52 may be initiated by the user to calibrate the system, or automatically repeated at predetermined time intervals, or repeated based on some internal or control event. For example, block 52 may be repeated whenever the control cursor is not detected within the image.

Referring now to FIG. 2 and FIG. 11, images projected by the presentation computer are received from the video monitor 30, block 70. Preferably, the video monitor 30 is a digital camera that includes a CCD or CMOS array and an appropriate frame capture card to digitize and capture the images.

The image is processed to detect the position of the calibration marks as represented by blocks 72 and 74. The operations represented by blocks 72 and 74 may be selectively repeated under various circumstances. Preferably, one of the calibration marks is utilized as the origin for a normalized coordinate system to determine position of the control cursor relative to the presentation computer output as described above.

After completing the calibration or registration process, block 74, images are repeatedly captured and processed as represented by block 76. A captured image is then processed to detect at least one primary attribute of the control cursor, block 78. Preferably, the primary attributes are image intensity and image repetition rate, as represented by blocks 80 and 82, respectively. The position of the control cursor, is preferably also detected relative to the position of the calibration marks, block 78. If the processor fails to detect at least one of the primary attributes at block 78, the processor is reset to block 70 and the processing steps 72, 74, 76 and 78 are repeated until a frame containing the control cursor with one or more embedded primary attributes is captured and confirmed.

Upon detection of a frame containing the projected control cursor 24, the primary attributes are identified and confirmed, the cursor position coordinates are calculated, and this information is captured (stored) in the memory module 38. Then, the image processor 28 is conditionally advanced to the next processing step where the captured image then processed to detect at least one secondary attribute of the control cursor, block 84. Preferably, the secondary attributes are image size, image color, and image pattern, as represented by blocks 86, 88 and 90, respectively.

In addition, any one or more of the primary attributes may be used in combination with any one of the secondary attributes to generate appropriate commands for the presentation computer. For example, the primary attribute, repetition (blink) rate, represented by block 82, may be used in combination with the various secondary attributes, namely size, block 84, color, block 86, or pattern, block 88 of the control cursor, i.e., different command can be provided by selecting either the color and/or shape of the control cursor in combination with its blink rate or intensity.

The secondary attributes of the control cursor that are detected and decoded at block 84 are converted to corresponding commands to control the presentation computer 12, block 92. This may be accomplished by any of a number of known strategies. For example, a data structure may be used to associate various secondary attributes or combinations of primary attributes and secondary attributes with corresponding commands in a particular software application.

The words used in this specification are words of description rather than limitation, and it is understood that various changes may be made without departing from the spirit and scope of the invention as defined by the appended claims.

We claim:

1. A computer presentation system for generating commands for remotely controlling a presentation computer based on a plurality of user selectable properties of an optical cursor generated by a hand-held pointer and projected onto a screen displaying output images projected onto the screen from the presentation computer, comprising in combination:
    an optical projector coupled to the presentation computer for projecting images output from the computer onto the screen;
    an optical pointer for projecting an image of a control cursor characterized by a primary image attribute, the primary image attribute being a predetermined image repetition rate and independent of control cursor projection angle limitations as well as presentation background image limitations, and the control cursor being characterized by one or more secondary image attributes, each secondary image attribute being encoded with a command corresponding to a specific computer operation, and the image properties of the primary image attribute and secondary image attributes are mutually exclusive with respect to each other;
    a camera for capturing images projected onto the screen; and
    an image processor connected in communication with the camera for processing the captured images to (a) detect the control cursor on the basis of the primary image attribute of the control cursor, (b) determine the position of the control cursor relative to output from the presentation computer, and (c) generate a command signal for output to the presentation computer based on one or more of the secondary image attributes, subject to the condition that the presence of the primary image attribute is detected in the image of the control cursor.

2. A computer presentation system as set forth in claim 1, wherein the control cursor is characterized by one or more secondary image attributes selected from the group consisting of image color, image size and image pattern.

3. A computer presentation system as set forth in claim 1, wherein the image processor includes control logic means for generating a command signal for output to the presentation computer based on one or more of the secondary image attributes only if the presence of the primary image attribute is detected in the control cursor.

4. A computer presentation system as set forth in claim 1, wherein the image processor includes control logic means for generating a command signal for output to the presentation computer based on a combination of the primary image attribute and one or more of the secondary image attributes.

5. A computer presentation system as set forth in claim 1, wherein the image processor includes pixel intensity differential means for detecting the presence of the primary image attribute of the control cursor image.

6. A computer presentation system as set forth in claim 1, wherein the image processor includes recognition software for decoding one or more of the secondary image attributes of the control cursor image.

7. A computer presentation system as set forth in claim 1, wherein the optical pointer comprises a hand-held pointer having a polychromatic light source operable for projecting a control cursor in the form of a light beam having the predetermined image repetition rate as the primary image attribute, and one or more user selectable image colors, sizes, or patterns as its secondary image attributes.

8. A computer presentation system as set forth in claim 7, wherein the optical pointer includes a rotary template having a set of apertures formed therein, the apertures having geometrical profiles through which polychromatic light can be directed for providing the secondary image attributes of shape, size, geometrical profile and pattern.

9. A computer presentation system as set forth in claim 7, wherein the optical pointer includes a rotary carousel having a set of color filters carried thereon, wherein the secondary image attribute of color is provided by projecting the polychromatic light beam through a selected one of the filters.

10. A method for remotely controlling a presentation computer that is coupled to an associated presentation screen for displaying output from the presentation computer and having an internal cursor generated by the presentation computer, the method comprising:
    producing a control cursor image characterized by a primary image attribute, the primary image attribute being a predetermined image repetition rate and independent of control cursor projection angle limitations as well as presentation background image limitations, and the control cursor being characterized by one or more secondary image attributes, each secondary image attribute corresponding to a specific computer operation, and wherein the image properties of the primary image attribute and secondary image attributes are mutually exclusive with respect to each other;
    detecting the primary image attribute of the control cursor and determining the position of the control cursor relative to output from the presentation computer;
    detecting one or more of the secondary image attributes of the control cursor;
    generating a command signal for output to the presentation computer based on one or more of the secondary image attributes; and
    inputting the command signal to the presentation computer, subject to the condition that the presence of the primary image attribute is detected in the image of the control cursor.

11. The method of claim 10, including the step:
    generating a command signal for output to the presentation computer based on the primary image attribute and one or more of the secondary image attributes.

12. The method of claim 10, comprising the steps:
    capturing an image of the presentation screen and the control cursor with a camera;
    processing the captured image to detect the presence of the primary image attribute in the image of the control cursor; and
    processing the image of the control cursor to decode one or more of the secondary attributes and generating a command signal for output to the presentation computer based on one or more of the secondary image attributes, subject to the condition that the presence of the primary image attribute is detected in the image of the control cursor.

13. The method of claim 10, comprising the steps:
capturing an image of the presentation screen and the control cursor with a camera;
processing the captured image to detect the presence of the primary attribute in the image of the control cursor; and
processing the image of the control cursor to decode one or more of the secondary image attributes and generating a command signal for output to the presentation computer based on a combination of the primary image attribute and one or more of the secondary image attributes, subject to the condition that the presence of the attribute is detected in the image of the control cursor.

14. The method of claim 10 wherein the step of producing a control cursor comprises the step:
conforming the control cursor to one or more secondary image attributes selected from the group consisting of control image color, control image size and control image profile, shape or pattern.

15. The method of claim 14, wherein the control cursor is produced by an optical pointer that includes a rotary template having a set of apertures formed therein, the apertures having predetermined geometrical profiles, and the step of conforming the control cursor comprises projecting a beam of light through a selected one of the apertures to provide the secondary image attributes of shape, size, geometrical profile and pattern.

16. The method of claim 14, wherein the control cursor is produced by an optical pointer that includes a rotary carousel having a set of color filters disposed therein, and the step of conforming the control cursor comprises projecting a beam of light through a selected one of the color filters to provide the secondary image attribute of color.

17. A method for generating presentation computer commands based on cursor position and image attributes of a control cursor, the method comprising:
displaying output from a presentation computer on a presentation screen;
producing a control cursor having a primary image attribute and one or more secondary image attributes, wherein the primary image attribute and secondary image attributes are mutually exclusive with respect to each other, respectively, and the secondary attributes each being encoded to correspond to a specific computer operation, the primary image attribute being a predetermined image repetition rate;
displaying the control cursor on the presentation screen;
capturing an image of the screen display;
detecting the primary image attribute of the control cursor and determining the position of the control cursor relative to output from the presentation computer; and
processing the image of the control cursor to decode at least one of the secondary attributes subject to the condition that the presence of the primary image attribute is detected in the image of the control cursor; and
generating a command signal based on the position of the control cursor and the at least one secondary image attribute for output to the presentation computer for causing the internal cursor to move to the control cursor position.

* * * * *